Nov. 17, 1959 A. C. LUTHER, JR., ET AL 2,913,621

PROTECTION SYSTEM FOR CATHODE RAY TUBES

Filed March 31, 1958 2 Sheets-Sheet 1

INVENTORS
LEONARD J. BAUN &
BY ARCH C. LUTHER, JR.
W. H. Sprague
ATTORNEY

PROTECTION SYSTEM FOR CATHODE RAY TUBES

Filed March 31, 1958 2 Sheets-Sheet 2

INVENTORS
LEONARD J. BAUN &
BY ARCH C. LUTHER, JR.

W. H. Sprowle
ATTORNEY 2,913,621

PROTECTION SYSTEM FOR CATHODE RAY TUBES

Arch C. Luther, Jr., Merchantville, and Leonard J. Baun, Collingswood, N.J., assignors to Radio Corporation of America, a corporation of Delware Application March 31, 1958, Serial No. 725,018

12 Claims. (Cl. 315—20)

This invention relates to a protection system and more particularly to a system for protecting a cathode ray tube and its associated high voltage supply in case of circuit failure and improper operating conditions.

It has become more or less a general practice in the monochrome television art to obtain the high voltage required for the final accelerating electrode of a receiver's kinescope from a (flyback) pulse type supply. The high voltages are developed through rectification of the high amplitude, transient, flyback pulses appearing in the receiver's horizontal output transformer during retrace periods of the line scanning cycle when cutoff of the horizontal output tube causes a sudden collapse of the magnetic field in the horizontal deflection yoke. This same type of high voltage supply is used for the final accelerating electrode, or so-called ultor electrode, in color kinescopes. However, the high voltage requirements of a typical color kinescope are greater in magnitude, more critical as to regulation, and generally more demanding than the comparable supply requirements of a monochrome kinescope.

To more particularly appreciate the purposes of the present invention, as well as its form, a description of a conventional color kinescope ultor supply is set out. In a typical high voltage supply for a color kinescope, high voltage flyback pulses derived from the horizontal deflection output transformer, are applied to the input electrode of a rectifier. The rectifier delivers a charging current to a capacitor connected between the output electrode of the rectifier and a point of reference potential in response to the rectification of the flyback pulses. The D.C. voltage developed across the charging capacitor is applied to the kinescope ultor electrode. Since the effective loading on the ultor supply will necessarily vary with picture content, i.e. with beam current, D.C. regulation is generally required. Suitable voltage regulation is achieved by shunting the space discharge path of a regulator tube across the rectifier output circuit. A suitable error or reference potential for the control electrode of the regulator tube may be derived from a bleeder resistor shunted across the rectifier output circuit or from a tap in the B-boost circuitry.

Current practice in color television receivers and monitors using shadow-mask color kinescopes requires operating the kinescope at or near its maximum ratings for high-voltage power input. In order to provide good regulation, this means that the high voltage supply should be capable of providing considerably more than the safe power input to the kinescope. A monitor or receiver operating this way can be overloaded and possibly damaged by the simple condition of applying excessive level of video signal to the kinescope, which can occur at any time, and may not be noticed by the operator. Therefore, an automatic system to protect both the kinescope and high-voltage supply against the condition of video signal overdrive is desirable.

High voltage circuits for the color kinescope usually operate in the range of 80–100 watts input. At this power level, the loss of kinescope input drive or a failure in the load or regulating circuit can result in a violent overload and even destruction of the associated components. Therefore, the protection system should include means to remove power in case of a malfunction of the high voltage circuits. This type of protection circuit should be fail-safe.

Accordingly, it is an object of the invention to provide a novel cathode ray tube protection circuit.

Another object of the invention is to provide a novel and improved circuit for protecting both the kinescope and its associated high voltage supply of a television reproducing system against conditions of video signal overdrive.

A further object of the invention is to provide a novel and improved protection system for the high voltage supply of a television reproducing system that removes the power input in the event of malfunction of the high voltage circuits of the reproducing system.

An additional object of the present invention is to provide a novel and improved fail-safe high voltage circuit for a color television reproducing device.

In accordance with one form of the invention, the cathode of the high voltage supply circuit shunt regulator tube is D.C. coupled through at least a portion of a unilateral conducting device to a point of fixed reference potential. As long as the regulator tube current exceeds a predetermined minimum value (indicating no high voltage overload), the unilateral conducting device remains in a state of conduction and the cathode of the high voltage shunt regulator tube remains clamped at the fixed reference potential. But when the current in the shunt regulator tube drops below this predetermined value minimum (indicating an overload condition in the kinescope), the unilateral conducting device cuts off and the shunt regulator tube cathode potential drops rapidly. This drop in potential is readily sensed by a sensing or detecting circuit which supplies additional bias to beam intensity controlling electrodes of the kinescope, thereby to limit and eventually cutoff the kinescope beam current.

If this kinescope biasing circuit is incapable of reducing the beam current or if some other failure occurs, such as loss of the flyback pulses, the regulator cathode voltage will continue to drop. If this drop in voltage falls below a second predetermined critical level, the sensing circuit acts to operate a relay in the power supply to remove the B+ from all the circuits in the television receiver. In the case of a regulator tube failure or high voltage rectifier failure, no cathode voltage will develop at the cathode of the shunt regulation tube; hence, the B+ relay will operate to remove power from the receiver. In fact, anything which causes an abnormally low high voltage output from the high voltage supply will cause the detecting circuit to remove the power input to the receiver.

The novel features of this invention, as well as the invention itself, both as to its organization and method of operation, will best be understood from the following description, when read in connection with the accompanying drawings, in which like reference numerals refer to like parts, in which.

Figures 1, 2:
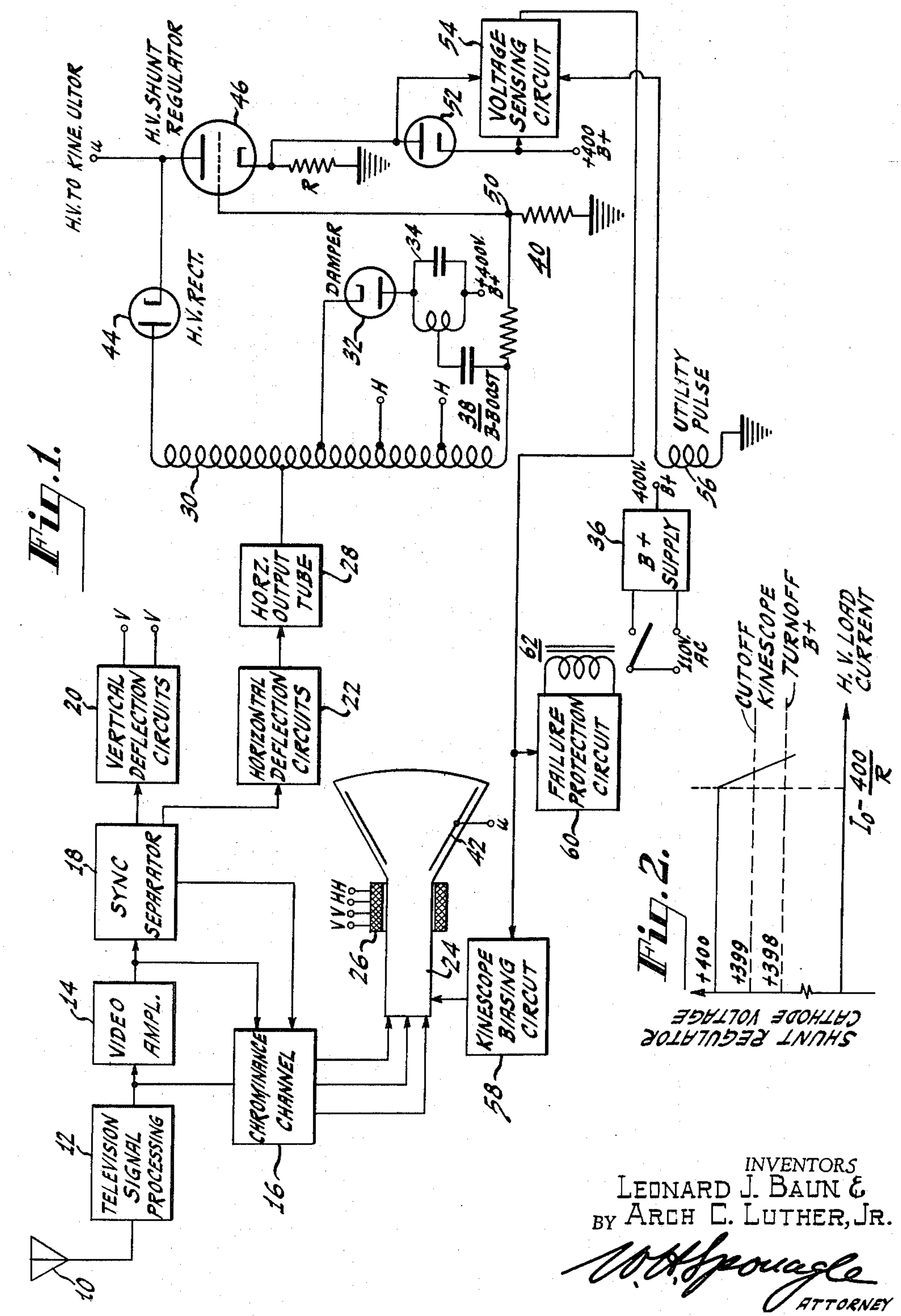
Figure 1 is a partial block diagram of a typical color television receiver wherein the high voltage supply circuit including the overload protection circuit in accordance with the invention is illustrated in schematic form.
Figure 2 is a graph illustrating the manner in which the shunt regulator tube cathode voltage varies with the high voltage supply load current.

Referring now to Figure 1, there is shown a typical color television receiver such, for example, as that described in "Practical Color Television for the Service Industry," published by RCA Service Company, Inc., Camden, New Jersey, second edition, April 1954. While the specific form of the signal processing apparatus does not constitute a part of the invention, the showing of a suitable receiver is made to fully and clearly set forth the environment in which the invention may operate. Note that in the figures, the several blocks employed do not include a ground symbol. The ground symbol as been omitted for the sake of clarity but may be assumed as present where needed to complete a circuit.

In Figure 1, a transmitted television signal received by an antenna 10 is applied to the input terminals of a television signal processing section 12 of the receiver. This signal processing section may include the usual radio frequency, mixer, intermediate frequency, and second detector stages of a typical television receiver. In the alternative, the television receiver signal processing section 12 may be considered as the input of a composite color television signal from a suitable studio signal source. In this case, the remainder of the circuitry in Figure 1 would then be termed a color television monitor. The invention as will be described below has equal utility with either a receiver or a monitor.

The detected signal information, which is now in the form of a composite color television signal, is applied simultaneously to a video amplifier 14 and to a chrominance channel 16. The chrominance channel 16 processes the chrominance signal portion of the composite signal. The video amplifier 14 amplifies the luminance and synchronizing portions of the composite color television signal. The synchronizing components are then passed from the the output of the video amplifier 14 through a synchronizing signal (sync) separator 18 which then drives the vertical deflection circuits 20 and the horizontal sawtooth generator 22. The sync separator 18 also provides a keying pulse to the chrominance channel 16 to separate the color synchronizing burst from the composite signal so that it may be used to control the demodulation of the chrominance signal in a conventional manner and thus derive color difference signals. These color difference signals are then matrixed in the chrominance channel 16 with the luminance information derived from the video amplifier 14 to provide color signals which are applied to a cathode ray tube or color kinescope 24.

The color kinescope 24 includes a deflection yoke 26 having terminals VV for the vertical and HH for the horizontal windings of the yoke. The vertical deflection winding terminals VV are coupled to the output terminals VV of the vertical deflection circuit 20.

The horizontal sawtooth generator 22 drives a horizontal output tube 28 which in turn drives the horizontal output transformer 30. The horizontal deflection winding terminals HH derive line frequency scanning waves from output terminals HH of the horizontal output transformer 30 which is energized by a current supplied by the horizontal output tube 28. The horizontal output transformer 30 is of the auto transformer type, the output of the horizontal output tube 28 being applied across a selected portion of the total series of windings and the horizontal deflection windings HH being effectively coupled across a small segment of this portion. A conventional damper tube 32 is illustrated as having its cathode connected to the high voltage output transformer 30 and having its anode connected by way of an L.-C. circuit 34 to a point of fixed reference potential. In this case, the point of fixed reference potential is that of the plate or B+ supply circuit 36. The lower portion of the high voltage output transformer 30 includes a conventional B-boost circuit 38 which returns the lower end of the horizontal output transformer 30 through a resistance voltage divider 40 to ground. The high voltage for the ultor electrode 42 of the kinescope 24 is provided by a high voltage rectifier 44 whose anode is connected to the high potential terminal of the output transformer 30. The ultor supply output terminal U is connected to the cathode of the high voltage rectifier 44.

A high voltage regulator tube 46 shunts the output of the high voltage rectifier 44 through a resistor R to ground. An error voltage for controlling the shunt regulator tube 46 is derived from a midpoint 50 on the voltage divider 40 associated with the B-boost circuit 38. This error voltage is applied to the control electrode of the high voltage shunt regulator tube 46. Thus far the circuit described of a typical television receiver is conventional. The B-boost voltage is a measure of the high voltage supplied to the kinescope ultor electrode 42 and controls the operation of the shunt regulator tube 46 such that the current (electron flow) in the shunt regulator varies inversely with the high voltage load current (beam current of the kinescope).

In accordance with the invention, a high voltage protection circuit, that includes a unilateral conducting device 52 and a voltage sensing circuit 54 (to be subsequently described in detail), is coupled to the cathode of the high voltage shunt regulator tube 46. The anode of the unilateral conducting device 52, which may be a diode, is coupled to the cathode of the shunt regulator tube 46. The cathode of the diode 52 is coupled to a point of reference potential, which in this instance is B+. The voltage sensing circuit 54 is actuated by flyback pulses derived from a utility winding 56 inductively coupled to the output transformer 30. Thus actuated, the voltage sensing circuit 54 compares the cathode voltage of the shunt regulator 46 to the fixed reference potential B+ and controls a kinescope biasing circuit 58 and a failure protection circuit 60 (both of which circuits will be described in detail subsequently). The kinescope biasing circuit 58 operates under control of the voltage sensing circuit 54 to supply additional bias to the conventional beam intensity controlling electrodes (not shown) of the kinescope 24. If biasing is unable to alleviate to overload condition, the failure protection circuit 60 operates a relay 62 to disconnect the A.C. power input to the B+ supply 36 of the television receiver.

The invention may be more easily understood with reference to the graph of Figure 2. Figure 2 illustrates the manner in which the regulator tube cathode voltage varies with high voltage load current. As long as the current in the shunt regulator tube 46, which is inversely proportional to the high voltage load current, exceeds the value of 400/R, the cathode of the shunt regulator tube 46 remains clamped by the diode 52 at the B+ potential of 400 volts. But when the high voltage load current increases to the point where the shunt regulator current drops below 400/R (wherein R is the value of the cathode resistor of the regulator tube 46), the diode 52 becomes nonconducting and the shunt regulator cathode potential drops rapidly in value. This drop in voltage is sensed by the sensing circuit 54 (the details of which will be described with reference to Figure 3). If the no load regulator tube current is $I_0$ then, when the kinescope load current exceeds $I_0$—400/R, the regulator current will drop below 400/R and its cathode voltage will fall. This situation can occur with video signal overdrive of the kinescope. The drop in the cathode voltage of the shunt regulator tube 46 is sensed by the sensing circuit 54 and applied to the kinescope biasing circuit 58, which supplies additional bias to the guns of the kinescope 24. This forms a negative feedback loop which acts to limit the kinescope beam current as soon as it exceeds $I_0$—400/R. Eventually, a cutoff bias is applied to the kinescope as the shunt regulator cathode voltage drop reaches a first critical level indicated by the 399 volt dotted line in Figure 2.

If the kinescope bias circuit 58 is not capable of reducing the load current or if some other failure occurs, the regulator cathode voltage will continue to drop. If the shunt regulator cathode voltage continues to fall below a second critical level indicated by the 398 volt dotted line in Figure 2, the relay 62 is operated by the failure protection circuit 60. This removes the A.C. power supplied to the B+ supply 36. This in turn removes the B+ from all the circuits of the receiver. In the case of a regulator tube failure or high voltage rectifier failure, no cathode potential develops at the shunt regulator tube 46 and the B+ supply is removed under control of the failure protection circuit 60. In addition, anything which causes an abnormally low high voltage output will cause the failure protection circuit 60 to turn off the monitor by removing the B+ voltage.

Figure 3:
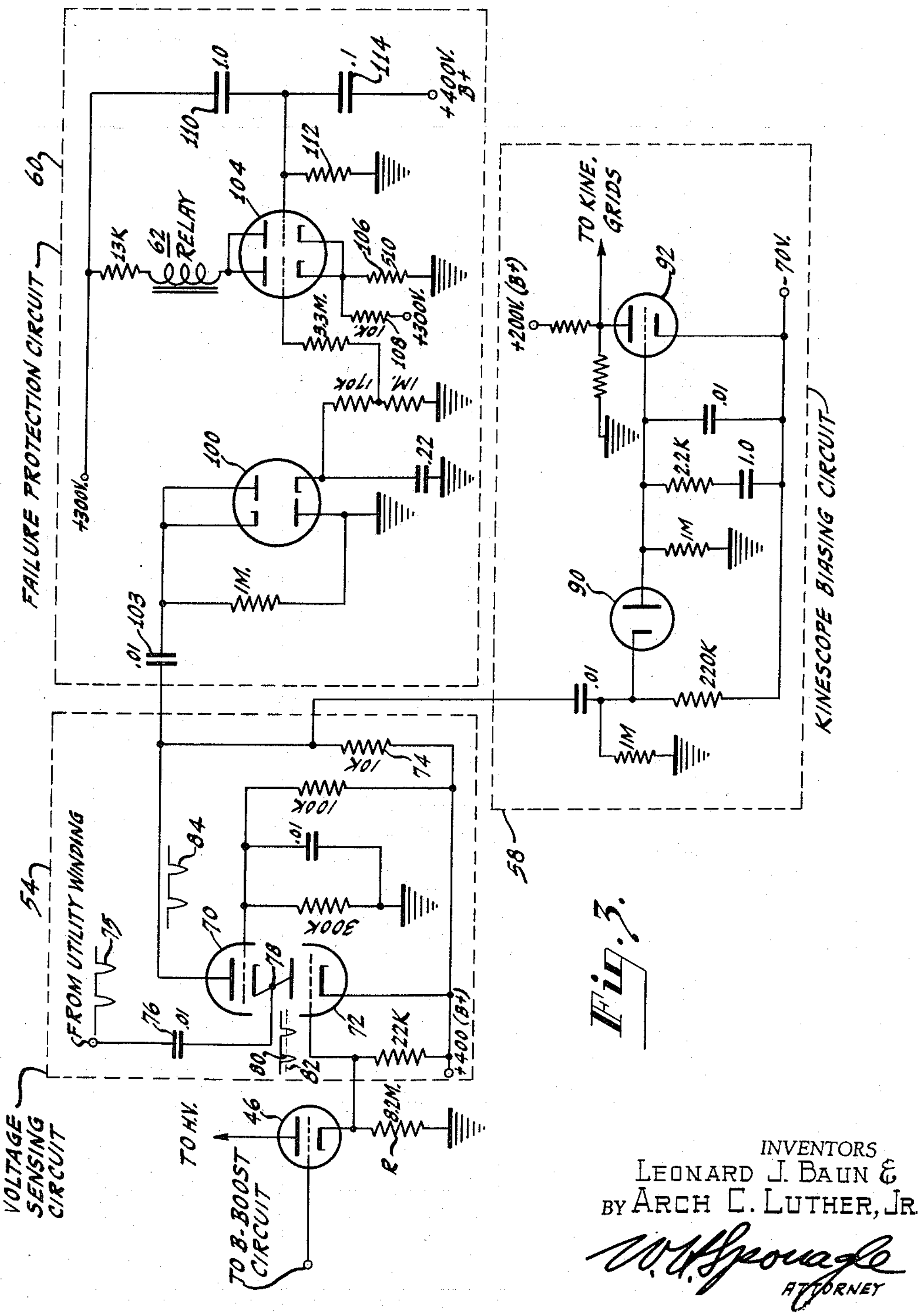
Figure 3 is a schematic diagram of a high voltage protection circuit in accordance with this invention.

The actual circuits for performing the sensing function, the kinescope biasing function, and relay control function are illustrated in detail in Figure 3.

To provide adequate protection, the several protection circuits 54, 58, and 60 must have:

(1) Self-starting upon application of power.

(2) Fail-safe operation of the +B protection portion of the circuit.

(3) D.C. coupling from the cathode of the regulator.

(4) Provision for start-up time delay of +B application with a single relay.

In Figure 3, the details of these several protection circuits are illustrated. The high voltage shunt regulator tube 46 has its cathode coupled to the voltage sensing circuit 54. Included in the voltage sensing circuit 54 are a pair of series connected triodes 70 and 72. The upper triode 70 has its anode coupled through a load resistor 74 to the B+ supply. The cathode of the lower tube 72 is also coupled to the B+ supply. The tubes 70 and 72 are energized by negative-going pulses 75 corresponding to the flyback pulses derived from the utility winding 56 (Fig. 1). These negative pulses 75 are coupled through a capacitor 76 to a common point 78 which is common to the cathode of the upper tube 70 and the anode of the lower tube 72. The energizing voltage for the series connected tubes 70 and 72 is provided by the action of these negative-going pulses 75, derived from the utility winding, passing through the coupling capacitor 76.

These negative pulses, which are in the neighborhood of 100 volts in negative amplitude, after passage through the coupling capacitor 76 are illustrated by the waveform 80 as varying about an A.C. axis 82 in both the positive and negative-going directions.

Initially, the capacitor 76 charges through tube 70 to approximately B+ potential such that the common point 78 is at the potential of B+. With the pulses 75 applied, the resultant voltage at the common point 78 varies around the B+ potential 82. On the negative portions of the waveform 80, tube 70 conducts causing the pulse voltage 84 to appear across resistor 74. On the positive portions of the pulses 80, the lower tube 72, which is normally biased to conduct in the absence of an overload condition under control of the cathode potential of the shunt regulator tube 46, serves to prevent the common point 78 from achieving an average potential greater than that of the B+ supply. The grid of the lower tube 72 draws grid current and functions as the diode 52 (Figure 1) to clamp the cathode of the shunt regulator tube to B+. Note that the plate voltage for the lower tube 72 in the voltage sensing circuit 54 is maintained only in the presence of flyback pulses being generated by the horizontal output transformer 30 (Fig. 1). Diminution or loss of amplitude of the flyback pulses results diminution or loss of the pulses 84, which may be considered as control pulses.

If a condition of overload in the high voltage circuit occurs, the cathode current of the shunt regulator tube 46 drops below the critical value of 400/R, and the lower tube 72 is biased down. The cathode of the shunt regulator tube 46 is no longer clamped to B+ by grid current conduction in the lower tube 72. Under these conditions, the positive-going excursions of the waveform 80 above the A.C. axis 82, are unable to pass through the lower tube 72 to A.C. ground (through the B+ supply). The capacitor 76 begins charging and the common point 78 increases in potential. The upper tube 70 tends to conduct less and the amplitude of the control pulses 84 derived from the plate of the tube 70 decrease in amplitude. Stated in another manner, because of the series connection of tubes 70 and 72, variation of the current by the lower tube 72 changes the current in the upper tube 70 such that the average current in each tube remains equal.

Thus, with the slightest reduction in voltage at the cathode of the shunt regulator tube 46, the lower tube 72 becomes more negatively biased thereby reducing the amplitude of the control pulses 84. These control pulses are sensed by the kinescope biasing circuit 58. Specifically, the sensing is accomplished by a diode 90 which rectifies these negative-going control pulses and thereby maintains a negative cutoff potential on the control grid of a kinescope biasing vacuum tube 92. If the control pulses from the voltage sensing circuit 54 decrease in amplitude, the negative bias applied to the grid of the biasing tube 92 decreases also, and the biasing tube conducts. The precise point at which conduction begins is determined by the cathode voltage of the biasing tube 92, which is illustrated as —70 v.

The anode of the biasing tube 92 is coupled to a beam intensity controlling electrode in the kinescope. With the advent of current flow in the biasing tube 92, its plate voltage is reduced thereby applying additional bias to the kinescope to reduce the load current therein. If the decrease in the high voltage regulator current is caused by overdrive of the kinescope, the action of the biasing tube 92 will prevent overload. The cathode potential of the shunt regulator tube 46 returns to +400 v. with normal beam current in the kinescope. On the other hand, if video signal overdrive is not the trouble, the operation of the biasing tube 92 will not stop the decrease of pulse amplitude of the pulses in the waveform 84 and an actual circuit failure is indicated.

As the potential at the cathode of the shunt regulator tube 46 continues to decrease below the second critical level of 398 volts (Figure 2), the amplitude of the protection pulses 84 also drops. This further drop actuates the failure protection circuit 60. These negative control pulses 84 are rectified by the double diode 100 which charges a condenser 102. The right side of the double diode 100 rectifies only the positive going variations of the control pulses that pass through the coupling capacitor 103 to charge the capacitor 102 to a value sufficient to maintain the left side of a relay control tube 104 conducting. The relay control tube 104 is a dual triode. The winding of the relay 62 is coupled to each of the anodes of the control tube 104. Thus, the relay control tube 104 controls the relay 62 which controls the power input to the B+ supply 36. The left side of the relay control tube 104 is normally biased to cutoff by a bleeder network 106 which is coupled between a +300 volt supply (which supply is separate from and not controlled by the protection relay 62). As long as the left side of the relay control tube 104 is in a conducting state, as determined by the amplitude of the pulses from the control pulses 84, the protection relay 62 is energized and the 400 volt B+ supply is available to the television receiver. When the cathode voltage of the shunt regulator tube 46 falls below the second critical value (398 volts as indicated by the graph of Figure 2), the control pulses derived from the voltage sensing circuit 54 decrease below that value necessary to maintain conduction on the left side of the relay control tube 104 and the relay 62 is de-energized, thereby removing the plate voltage supply for the entire color television receiver. As noted above, the particular cutoff point for the relay control tube 104 is determined by the resistance values of the cathode bleeder network including the resistors 106 and 108.

The remainder of the circuit involving the right half of the relay control tube 104 constitutes a starting circuit which allows the color television receiver to arrive at a stable operating condition prior to the time that the failure protection circuit assumes control. The right side of the relay control tube 104 is normally biased off by virtue of the fact that its cathode is coupled through a voltage divider resistor 108 to the 300 volt supply. When the equipment is turned on, a first capacitor 110, which is coupled between the 300 volt supply and the grid of the right half of the relay control tube 104, begins charging through the grid resistor 112 to ground. Charging of this capacitor 110 keeps the right half of the relay control tube at zero bias long enough to close the protection relay 62 and thereby couple the B+ supply to the color television receiver. The delay time is governed by the filament warm-up time of the 300 volt supply and the time delay tube 104 (right half). Once the protection relay 62 closes, the charging of a second capacitor 114 connected to the 400 volt B+ supply of the receiver through the same grid leak resistor 112 keeps the relay closed long enough to start the horizontal deflection and high voltage circuit and allow the protection pulses from the voltage sensing circuit to build up and assume control. When capacitors 110 and 114 approach final charge, the voltage across the grid leak resistor 112 approaches zero. The divider resistor 108 then acts to cutoff tube 104 (left side) so that only the protection voltage keeps the monitor on.

There has thus been described a relatively simple protection circuit for a color television receiver or monitor which is capable of protecting both the kinescope and its associated high voltage supply against the condition of video signal overdrive. The protection system is capable of removing power from the television receiver in case of a malfunction of the high voltage circuits. Further, the protection circuit in the event of malfunction is fail-safe in that the malfunction of any of the components of the protection circuit will shut down the receiver.

What is claimed is:

1. In a cathode ray tube system including a cathode ray tube device comprising a beam intensity controlling electrode and an ultor electrode, a high voltage supply including a source of flyback pulses and a rectifier for rectifying said flyback pulses having an output electrode, a protection system comprising a shunt regulator tube means coupled to said rectifier output electrode for maintaining said output electrode at a substantially constant potential, means coupled to said shunt regulator tube means for detecting a drop in the voltage provided by said high voltage supply, and means coupled to said intensity controlling electrode and to said detecting means for reducing said cathode ray tube beam intensity in event of a drop in said high voltage supply voltage.

2. In a cathode ray tube system including a cathode ray tube device comprising a beam intensity controlling electrode and an ultor electrode, a flyback pulse type of high voltage supply including a rectifier having an output electrode, a protection system comprising a shunt regulator tube means coupled to said rectifier output electrode for maintaining said output electrode at a substantially constant potential, means coupled to said shunt regulator tube means for detecting a drop in the voltage provided by said high voltage supply, and means responsive to said detecting means for applying a control signal to said beam intensity controlling electrode, and second means responsive to said detecting means for de-energizing said high voltage supply in the event of continued drop in the voltage provided by said high voltage supply.

3. A protection system in accordance with claim 1 wherein said detecting means includes a unilateral conducting device coupled to a point of reference potential such that said unilateral conducting device becomes nonconducting in the event of malfunction of said high voltage supply, and means responsive to non-conduction in said unilateral conducting device to reduce said cathode ray tube beam intensity.

4. A protection system in accordance with claim 3 wherein said high voltage supply has a power input circuit, said protection system also including means responsive to said detecting means for disconnecting said power input circuit in the event of a continued drop in the potential of said high voltage supply beyond a predetermined point.

5. The system set forth in claim 3 wherein said detecting means includes means responsive to the loss of said flyback pulses to reduce said beam intensity.

6. In a color television receiver including a color kinescope having an ultor electrode and a beam intensity controlling electrode, a high voltage supply comprising, in combination, a rectifier having an output circuit, means for coupling said ultor electrode to said output circuit and an electron flow device having an electron flow path and including an output electrode, said electron flow path effectively shunting said output circuit, overload protection means coupled to said output electrode to detect a deviation from a predetermined circuit condition, and means coupling said overload protection means to said beam intensity controlling electrode.

7. In a television receiver including a kinescope comprising an anode electrode and a beam intensity controlling electrode, a high voltage supply comprising, in combination, a rectifier having an output circuit, means for coupling said anode electrode to said output circuit, an electron flow device having an electron flow path and including a control element and an output element, said electron path effectively shunting said output circuit, said output element providing a signal indicating an overload condition in said high voltage supply, overload protection means coupled to said output element and responsive to said overload indicating signal to detect overload of said high voltage supply, and means coupling said overload means to said beam intensity controlling electrode to reduce the beam intensity in said kinescope in the event of overload of said high voltage supply.

8. In a cathode ray tube system including a cathode ray tube device comprising a beam intensity controlling electrode and an anode electrode, a high voltage supply including a source of flyback pulses and a B-boost circuit whose voltage varies inversely with beam intensity in said cathode ray tube device, a rectifier having an output electrode connected to said anode electrode, a protection system comprising an electron flow device including an anode, a cathode, and a control grid, means for connecting said anode to said output electrode, impedance means coupled between said cathode and a point of reference potential, means for coupling said control grid to said B-boost circuit in such a manner that the electron flow in said electron flow device varies inversely with the beam intensity in said cathode ray tube device whereby the voltage at said cathode provides an indication of excessive beam intensity in said cathode ray tube device, means for sensing a drop in said cathode voltage, and means responsive to said sensing means for applying a control signal to said beam intensity controlling electrode to reduce said beam intensity.

9. A protection system in accordance with claim 8 including additional means responsive to said sensing means for de-energizing said high voltage supply.

10. A protection system in accordance with claim 8 wherein said sensing means includes a second and third electron flow device each having an anode, cathode, and control electrode, means including a capacitor coupling said second electron flow device cathode and said third electron flow device anode to said source of flyback pulses to provide the supply voltage for each of said second and third electron flow devices, a load impedance, said third electron flow device cathode being coupled to a point of reference potential and through said load impedance to said second electron flow device anode, and means coupling said third electron flow device control electrode to said first electron flow device cathode to control the amount of amplification of said flyback pulses in accordance with the beam intensity in said cathode ray tube.

11. A protection system in accordance with claim 10 which includes means coupled to the anode of said second electron flow device and responsive to a reduced amplitude afforded said amplified flyback pulses for controlling said cathode ray tube beam intensity, and means coupled to the anode of said second electron flow device and responsive to a still more reduced amplitude of said amplified flyback pulses for de-energizing said high voltage supply.

12. In a color television receiver including a color kinescope comprising an ultor electrode and beam intensity controlling electrode, a high voltage supply comprising, in combination, a rectifier having an input and an output circuit, means for coupling said ultor electrode to said output circuit, an electron discharge device having a space discharge path and including a control grid and a cathode, said space discharge path effectively shunting said output circuit, and means for coupling said rectifier input circuit to said control grid, a voltage sensing circuit means for sensing when the potential at the cathode of said electron discharge device drops below a predetermined reference potential including a second and third electron discharge device each having a space discharge path and control grid, each of said second and third space discharge paths being connected in series to form a closed loop that is returned to said predetermined reference potential, a capacitor, said second and third electron discharge devices having a common point in said series connection, means for coupling said common point to said rectifier input circuit thereby to energize said second and third discharge devices, said second electron device control grid being coupled to said first electron device cathode, said third electron device control grid being coupled to said reference potential point whereby current flows in said third space discharge path so long as the potential of said first electron device cathode is greater than said reference potential, and means responsive to said absence of current flow in said third space discharge path to apply a biasing voltage to said beam intensity controlling electrode to reduce the beam intensity in said kinescope.

References Cited in the file of this patent

UNITED STATES PATENTS 2,607,018 Stolze ---------------- Aug. 12, 1952